United States Patent Office 3,386,779
Patented June 4, 1968

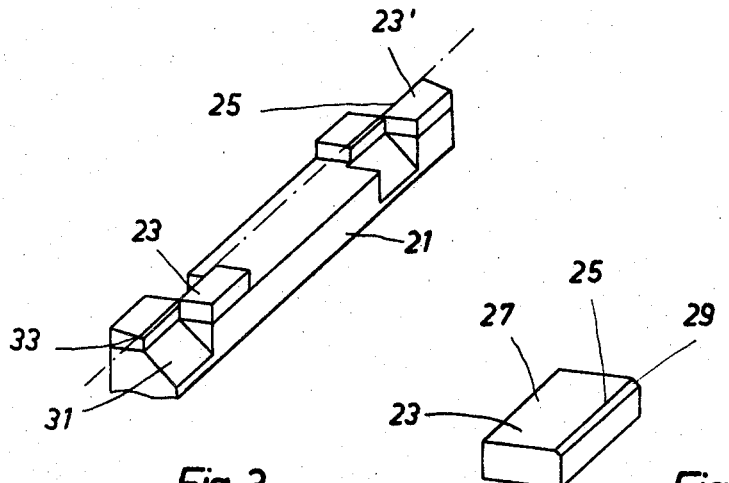
Fig. 3
Fig. 4
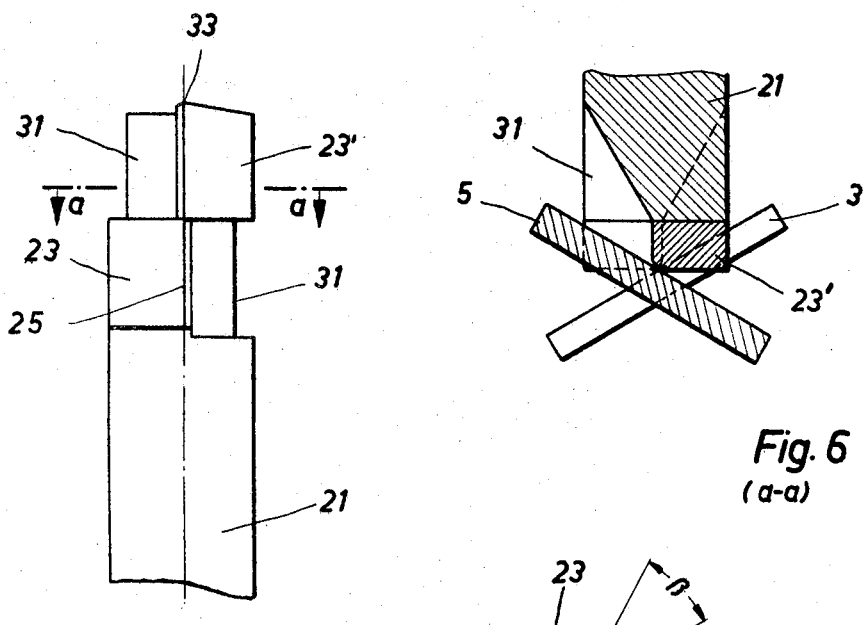
Fig. 5
Fig. 6 (a-a)
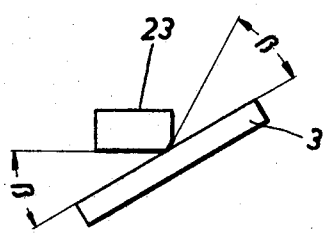
Fig. 7

3,386,779
KNIFE EDGE BEARING ASSEMBLY FOR
MEASURING INSTRUMENTS
Ludwig Weickhardt, Gottingen, Germany, assignor to Sartorius-Werke vormals Gottinger Prazisionswaagenfabrik G.m.b.H., A.G., Gottingen, Germany
Filed Dec. 13, 1965, Ser. No. 513,370
Claims priority, application Germany, Jan. 13, 1965,
S 94,992
8 Claims. (Cl. 308—2)

ABSTRACT OF THE DISCLOSURE

The invention relates to a knife edge bearing for a weighing scale in which two bearing plates are crossing each other. Two longitudinally aligned knife edges are assigned to the bearing plates. The faces defining the two knife edges are angularly staggered with respect to each other so that substantial clearance angles between each of the faces and the confronting bearing plates are obtained in the neutral position. Thus, the axis of rotation of the knife edge bar is exactly at the apex or nadir of the trough defined by the bearing plates. There is no shifting of the pivotal axis as in the prior art bearings. Nevertheless the invention enables the knife edges to be given obtuse angles. This facilitates manufacture with high precision and eliminates danger of destruction of the knife edges.

---

This invention relates to a knife edge bearing assembly for measuring instruments, particularly high-precision scales, which bearing assembly comprises crossing bearing plates, which extend transversely to a knife edge bar and each of which is capable of a limited pivotal movement on an axis which is transverse to the knife edge bar and parallel to the plane of the respective plate.

In a known bearing assembly of this type, each bearing plate is supported by two balls, which enable a displacement of the plate transverse to the knife edge bar, and a pivotal movement about an axis which is at right angles to the bar. For this purpose, the balls are disposed on said axis.

The plates together form a trough in the form of an obtuse-angled V. The knife edges of the bar rest in the trough and are defined by side faces which include an acute angle with each other. It is more desirable, however, to remove this acute-angled edge by a small bevel so that two obtuse angles are obtained between the bevel and the side faces. This design is selected because it enables a manufacture with higher precision and the danger of a breaking out of the knife edge is much smaller with obtuse angles than with acute ones.

In the accompanying drawings,

FIGS. 3 to 7 show an illustrative embodiment of the invention. Specifically,

FIG. 3 is a perspective view showing a knife edge bar with applied knife edge plates as viewed from the side and from below.

FIG. 4 is an enlarged view taken in the same direction as FIG. 3 and showing an individual knife edge plate.

FIG. 5 shows one end of the knife edge bar as viewed from below.

FIG. 6 is a sectional view taken on line a—a in FIG. 5 through the knife edge bar and a bearing plate, with the knife edge bar in its central position.

FIG. 7 illustrates the clearance angles between the side faces adjoining the knife edges, and a bearing plate.

Figure 1:
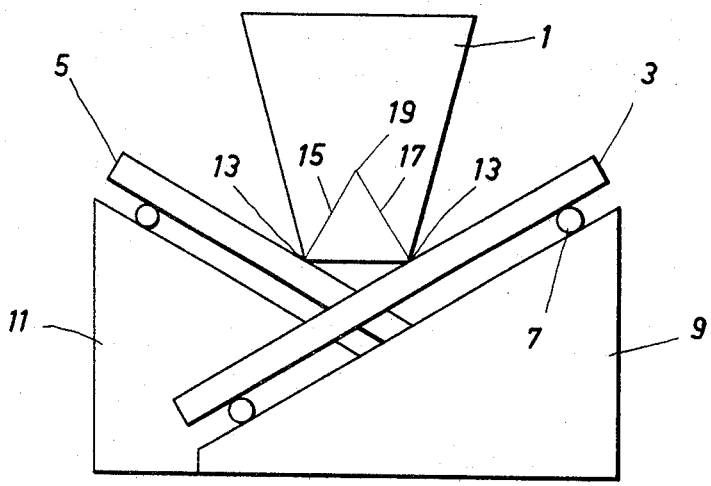
FIG. 1 is a diagrammatic view showing in an end elevation a known knife edge bearing assembly in a neutral position.
Figure 2:
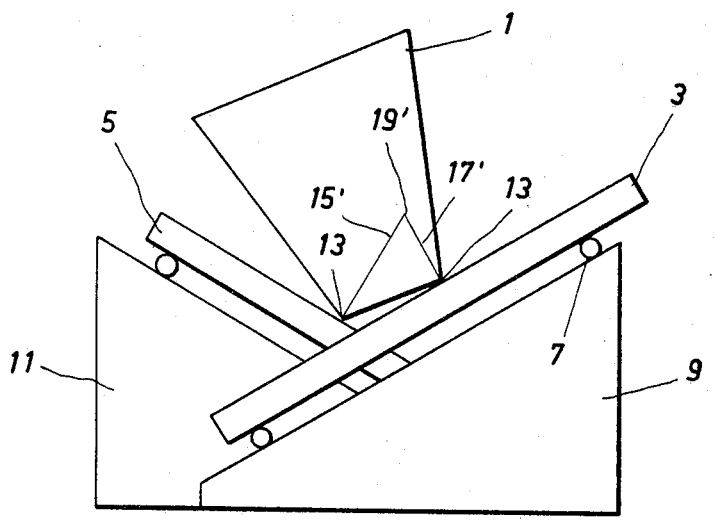
FIG. 2 shows the same bearing assembly after an excessive pivotal movement.

The prior art design shown in FIGS. 1 and 2 has the disadvantage that the pivotal axis of the knife edge member is not at the nadir of the trough so that the knife edge member performs a movement similar to rolling rather than a strictly pivotal one. As is shown in FIG. 1, the knife edge member 1 rests on the crossing bearing plates 3 and 5, which are supported by balls 7 on supports 9 and 11, respectively, so that the bearing plates are displaceable and are pivotally movable about an axis which is transverse to the knife edge member 1.

During a pivotal movement of the knife edge member 1, its edges 13 will cause the bearing plates 3 and 5 to follow this movement. As a result, the knife edge bar will be pivotally moved with instantaneous radii 15 and 17, which are at right angles to the surface of the bearing plates. The instantaneous pivotal axis 19 lies in the center plane of the knife edge member.

During a further pivotal movement of the knife edge member, the pivotal axis is shifted out of the center plane of said member, as is clearly apparent from FIG. 2 showing the position after an excessive pivotal movement. Instantaneous radii 15' and 17' are shown, which illustrate the pivotal movement in the position which is depicted and which define an instantaneous pivotal axis 19'. It is apparent that the pivotal axis moves transversely to the center plane of the knife edge member during the pivotal movement. Thus, the knife edge member does not perform a strictly pivotal movement in the bearing trough but a movement similar to rolling.

As the bevel of the knife edge member is very small, the resulting error is very small too and tolerable in many cases. If a very high precision is desired, however, this error must be avoided.

In the arrangement which is shown, another small error is due to the fact that the bearing plates 3 and 5 must be moved during the pivotal movement of the knife edge member. This results in a slight bearing friction. The multiplication of the frictional force and the instantaneous radii results in a frictional torque, which tends to oppose the rotation of the knife edge member. As a result, the sensitivity of the measuring instrument is correspondingly reduced.

According to the invention, these small errors are eliminated in that the knife edge bar is provided with a separate knife edge for each bearing plate, the knife edges of the knife edge bar are longitudinally aligned with each other, and the faces defining a knife edge associated with one of the bearing plates are angularly displaced relative to the faces defining the knife edge associated with the adjacent bearing plate so that substantial clearance angles are obtained between the faces and the bearing plates when the knife edge bar is in its neutral position.

Different from the known designs, the knife edges of the knife edge bar are not parallel but longitudinally aligned. Each bearing plate has a separate knife edge associated with it. The inclination of the faces defining each knife edge is selected in view of the inclination of the bearing plate. In the neutral position of the knife edge member, e.g., in a position as shown in FIGS. 6 and 7, the same clearance angle should exist between each defining face and the plate.

This arrangement enables a pivotal movement of the knife edge bar about an axis which is exactly at the nadir of the trough defined by the bearing plates. There is no longer a shifting of the pivotal axis and no need for a displacement of the bearing plates transverse to the knife edge. Thus, the invention improves the precision and sensitivity of the measuring instrument.

Besides, the angle at the knife edge may be relatively large and may be an obtuse angle. This has been possible before only with knife edge members having a bevel and formed with two parallel knife edges. The angle at the knife edge may even exceed the trough angle. This facilitates a manufacture with high precision and eliminates the danger of a breaking out of a knife edge.

In a preferred embodiment, a separate knife edge plate for each bearing plate is secured to the knife edge bar, particularly by adhesion. Those faces of each knife edge plate which define the knife edge thereof may be its upper plane, which may be horizontal, and an inclined plane. These planes include preferably an obtuse angle.

The two faces whose intersection forms the knife edge must be ground and polished. In order to minimize the manufacturing costs, it is a development of the invention that one of the two faces defining each knife edge is a bevel cut from the original, particularly right-angled, faces of a workpiece. In this case it will be sufficient to grind and polish the relatively narrow bevel. This bevel may have a small width, e.g., of 0.5 millimeter.

With reference to FIGS. 3 to 7, four knife edge plates, namely two inner plates 23 and two end plates 23', of bearing material, such as steel, agate or sapphire, are adhesively secured to a knife edge bar 21 of steel. As is shown in FIG. 4, the knife edge 25 is defined by the face 27 and the bevel 29. In its normal position, shown in FIG. 6, the face 27 faces downwardly.

The four plates 23 and 23' are adhesively secured to the knife edge bar so that their knife edges 25 are longitudinally aligned. This alignment is shown in FIGS. 3 and 5, where a dot-dashed line is shown passing through the aligned edges. For the accommodation of the bearing plates, the knife edge bar has a recess 31 opposite to each bearing plate, as shown in FIGS. 3 and 5.

FIG. 6 shows the knife edge bar resting in its neutral position on the crossing bearing plates 3 and 5. It is sufficient for these bearing plates to be pivotally movable about an axis which is transverse to the knife edges whereas a displacement of the bearing plates transverse to the knife edge is not required. The plates may be supported by balls in known manner, as is shown in FIGS. 1 and 2, or may be suspended from wire links.

As is apparent from FIG. 7, the side face and bevel of each knife edge plate 23 are so disposed that they form approximately equal clearance angles $\beta$ with the associated bearing plate when the knife edge bar is in the neutral position.

A longitudinal displacement of the knife edge bar must be prevented by stationary thrust plates. To ensure a contact between the bar and said plates without friction, each of the knife edge plates 23' disposed at the ends of the bar has an obtuse-angled, axially protruding outer end corner 33. For this purpose, the plate 23' is beveled on both sides of its knife edge 25 and toward the knife edge member 21.

What is claimed is:

1. A knife edge bearing assembly, which comprises a knife edge carrier, which is provided with at least one pair of longitudinally aligned knife edges, each of which is defined by the intersection of two faces, said assembly further comprising at least two bearing plates crossing each other, each engaged by one of said knife edges, said knife edge carrier being pivotally movable about said knife edges from a neutral position, the faces defining one of said knife edges being angularly displaced from those defining the other of said knife edges so that substantial clearance angles between each of said faces and the confronting bearing plate are obtained in said neutral position of said knife edge carrier; said assembly further comprising means supporting said bearing plates with a freedom of pivotal movement on axes transverse to said knife edges and parallel to the planes of the respective bearing plates.

2. A knife edge bearing assembly as set forth in claim 1, in which said clearance angles in said neutral position are equal.

3. A knife edge bearing assembly as set forth in claim 1, which comprises knife edge plates, which are secured to said knife edge carrier and each of which is formed with one of said knife edges.

4. A knife edge bearing assembly as set forth in claim 3, in which said knife edge plates are adhesively secured to said knife edge carrier.

5. A knife edge bearing assembly as set forth in claim 1, in which one of said faces defining one of said knife edges is a beveled surface between the other of said faces and an adjacent face.

6. A knife edge bearing assembly as set forth in claim 5, in which said other face and said adjacent face are at right angles to each other.

7. A knife edge bearing assembly as set forth in claim 1, in which said knife edge carrier is a bar provided at each of its ends with an axially protruding corner and further formed at each of its ends with two of said pairs of knife edges, each of said pairs of knife edges comprising an axially outer knife edge and an axially inner knife edge, each of said axially outer knife edges terminating at the center of the adjacent one of said corners.

8. A knife edge bearing assembly as set forth in claim 7, which comprises two knife edge plates secured to said bar, each of said knife edge plates defining one of said axially outer knife edges and one of said corners.

References Cited
UNITED STATES PATENTS

| | | | |
|---|---|---|---|
| 2,612,415 | 9/1952 | Williams | 308—2 |
| 2,646,318 | 7/1953 | Rice | 308—2 |
| 3,160,219 | 12/1964 | Meier | 177—198 |

FOREIGN PATENTS

| | | |
|---|---|---|
| 458,847 | 8/1913 | France. |
| 661,745 | 11/1951 | Great Britain. |

FREDERICK L. MATTESON, JR., *Primary Examiner.*

ROBERT A. DUA, *Examiner.*